United States Patent [19]
Geus et al.

[11] Patent Number: 5,744,035
[45] Date of Patent: Apr. 28, 1998

[54] MODULE CONTAINING ZEOLITE-BASED MEMBRANE AND PREPARATION THEREOF

[75] Inventors: Eduard Rudolf Geus; Wridzer Jan Willem Bakker, both of Delft; Jacob Adriaan Moulijn, The Hague; Herman van Bekkum, Vlaardingen; Jacobus Cornelis Jansen, Delft, all of Netherlands

[73] Assignee: Exxon Chemical Patents Inc., Wilmington, Del.

[21] Appl. No.: 362,515
[22] PCT Filed: Jul. 6, 1993
[86] PCT No.: PCT/NL93/00142
 § 371 Date: Jan. 31, 1995
 § 102(e) Date: Jan. 31, 1995
[87] PCT Pub. No.: WO94/01209
 PCT Pub. Date: Jan. 20, 1994

[30] Foreign Application Priority Data

Jul. 6, 1992 [NL] Netherlands ............... 9201204

[51] Int. Cl.$^6$ ................................................ B01D 29/00
[52] U.S. Cl. ............... 210/490; 210/510.1; 210/500.25; 210/651; 210/502.1; 427/245; 427/246
[58] Field of Search ........................ 210/650, 651, 210/652, 570.1, 500.25, 490, 653, 502.1; 427/245, 246

[56] References Cited

U.S. PATENT DOCUMENTS 5,069,794 12/1991 Haag et al. ........................ 210/650

*Primary Examiner*—Ana Fortuna
*Attorney, Agent, or Firm*—Edward F. Sherer

[57] ABSTRACT

The present invention relates to a continuous gastight film of zeolites on a porous underlayer, a zeolite membrane obtainable by calcining the gastight zeolite film, and a module with such a gastight zeolite film, which module consists of a membrane housing and a supported membrane, the whole of membrane housing and supported membrane being composed of not more than two materials.

24 Claims, 25 Drawing Sheets

Calcinated (1400°C) ZSM-5 (MFI) crystal on porous RVS support.
(magnification 100x)

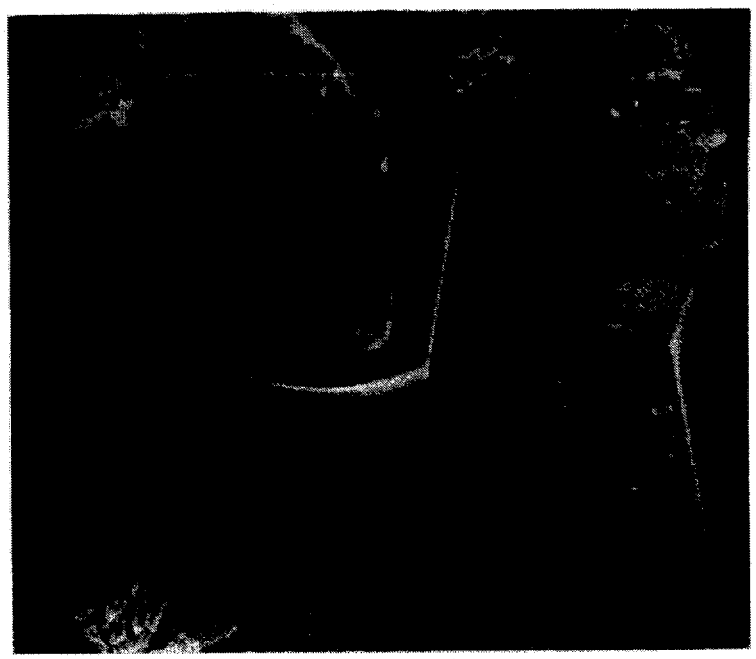
ZSM-5 (Mfl) crustal, as prepared on porous RVS support.
(magnification 150x)
FIG. A1.1
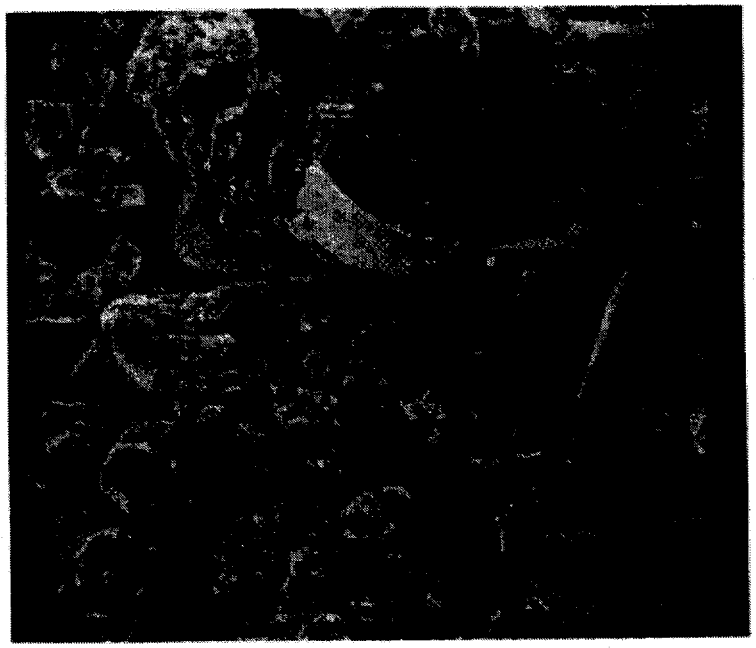
Calcinated (1400°C) ZSM-5 (MFI) crystal on
porous RVS support.
(magnification 100x)
FIG. A1.2

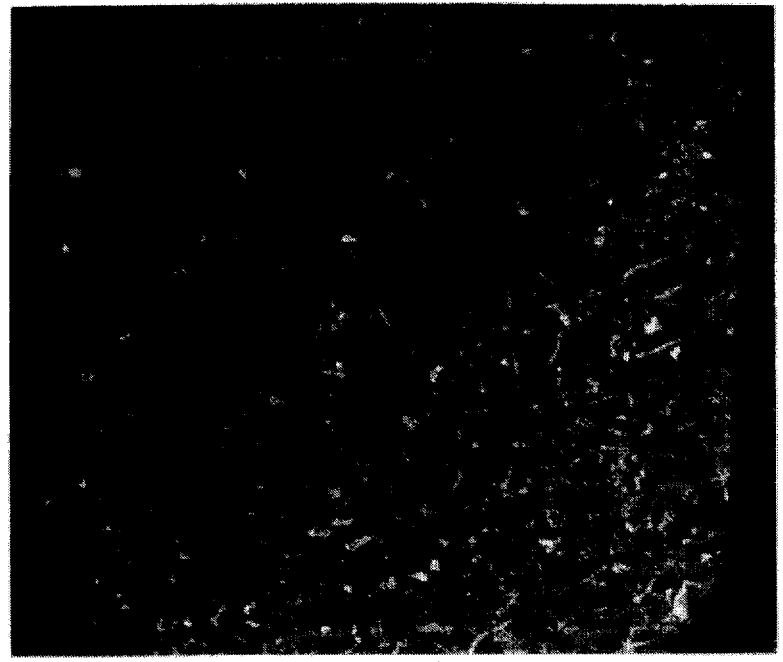
Top view MFI-film on two layers RVS support (magnification 200x)
FIG. A5.1
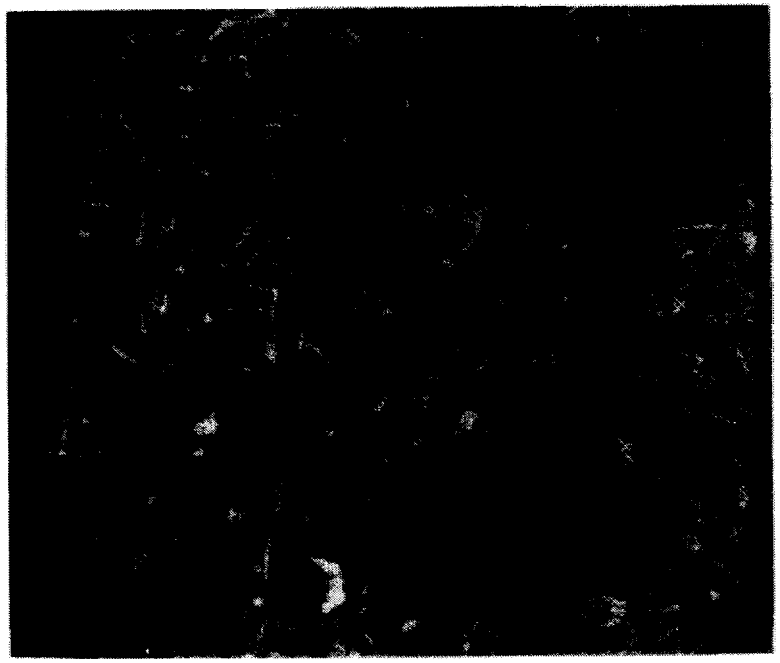
Top view MFI-film on two layers RVS support (magnification 400x)
FIG. A5.2

Top view MFI-film on two layers RVS support (magnification 600x)
FIG. A5.3

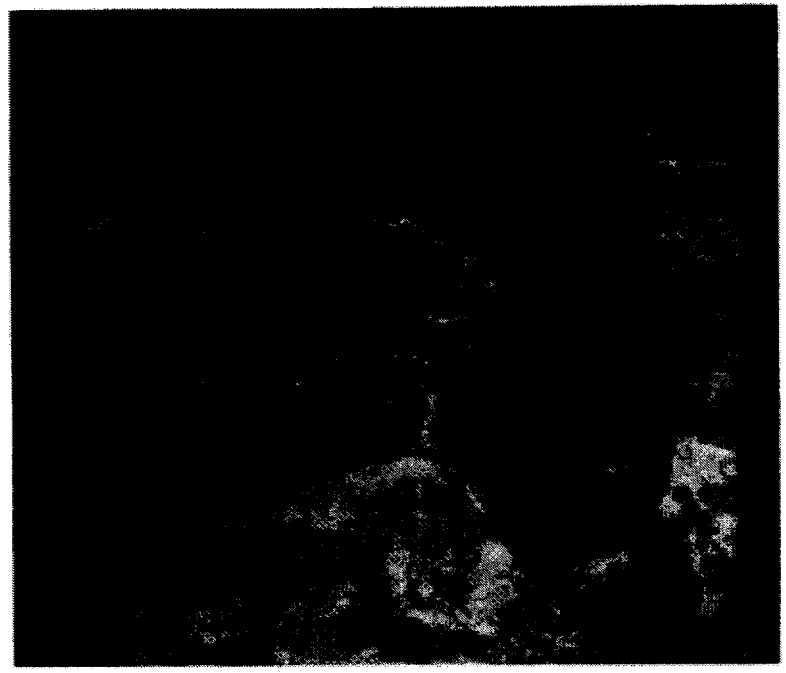
Cross sections MFI/RVS membrane
(magnification 100x)
FIG. A5.4
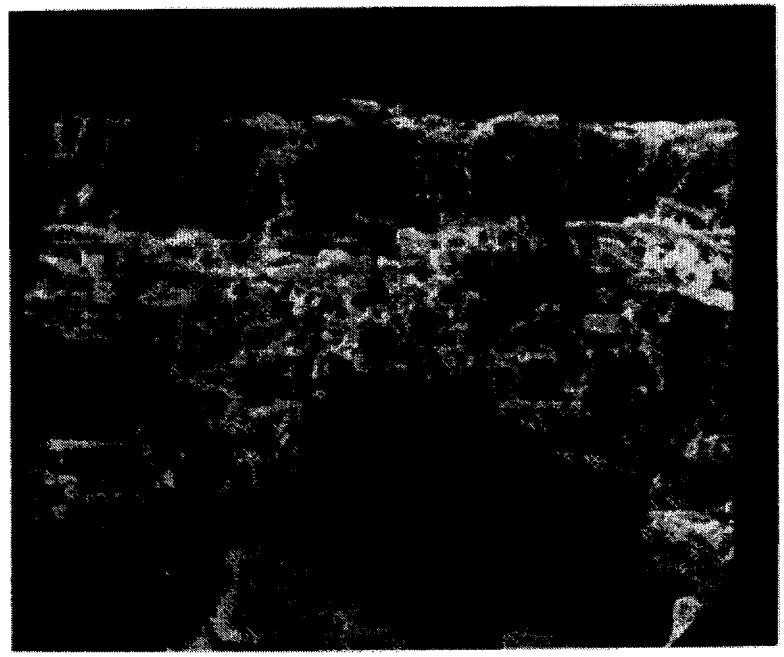
Cross sections MFI/RVS membrane
(magnification 180x)
FIG. A5.5

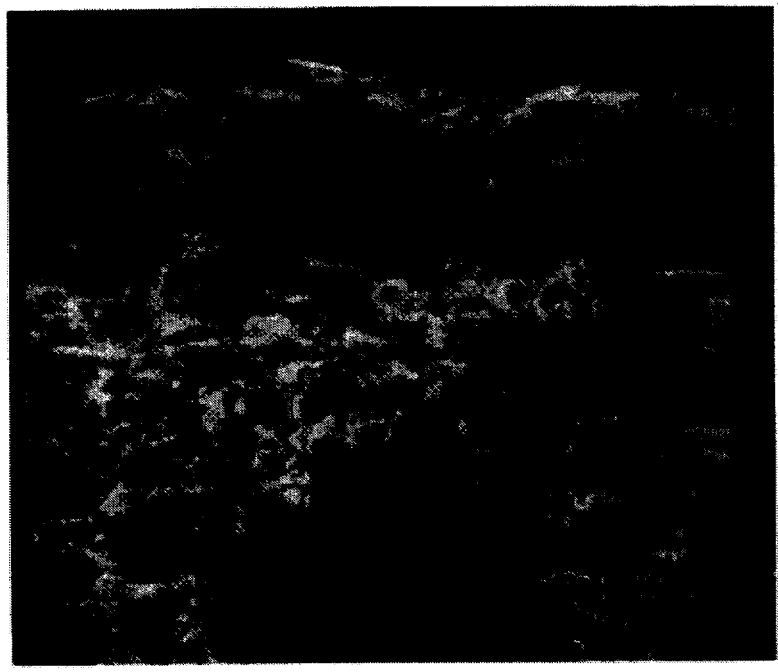
Cross sections MFI/RVS membrane
(magnification 300x) RVS top layer and MFI film
FIG. A5.6
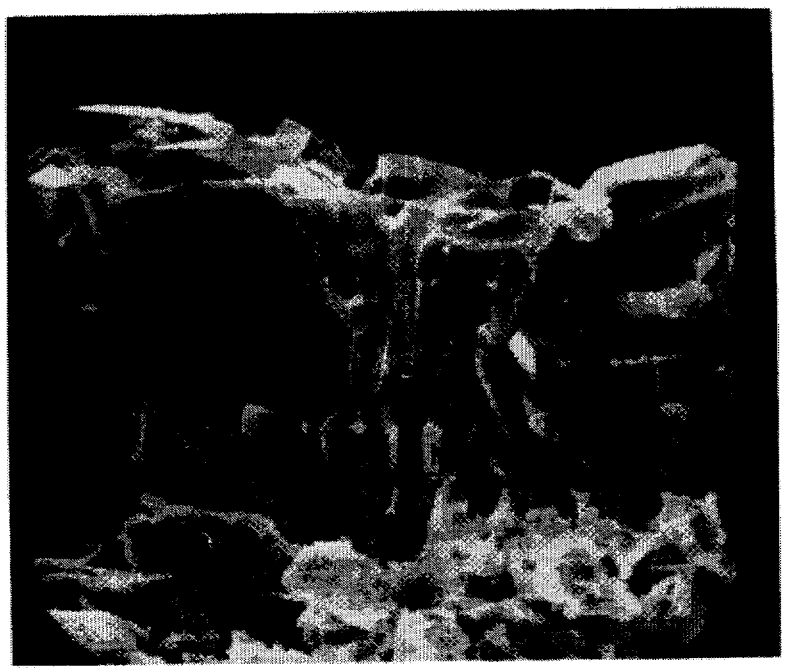
Cross sections MFI/RVS membrane
(magnification 600x)
FIG. A5.7

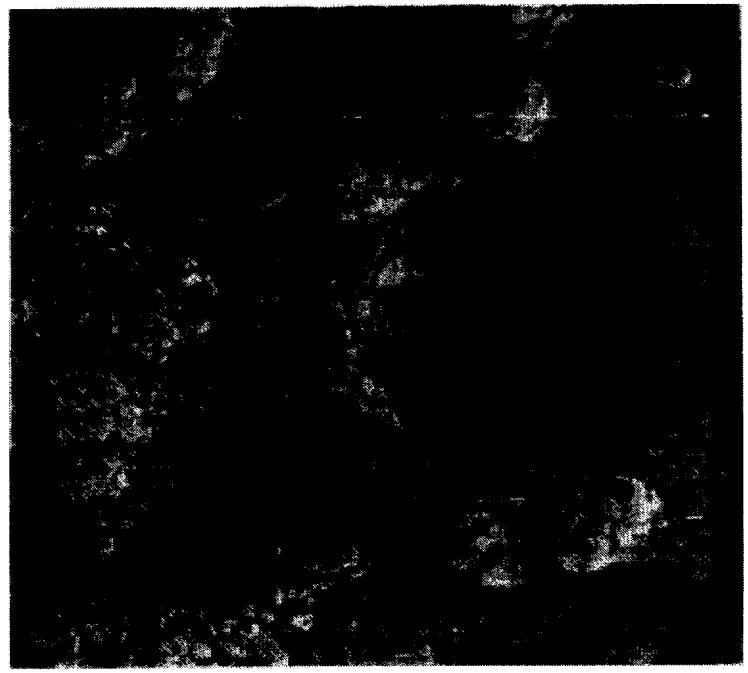
Top view unsupported MFI film, grown on teflon / large holes are visible.
(magnification 50x)
FIG. A6.1
Cross section unsupported MFI film, grown on teflon
(magnification 240x)
FIG. A6.2

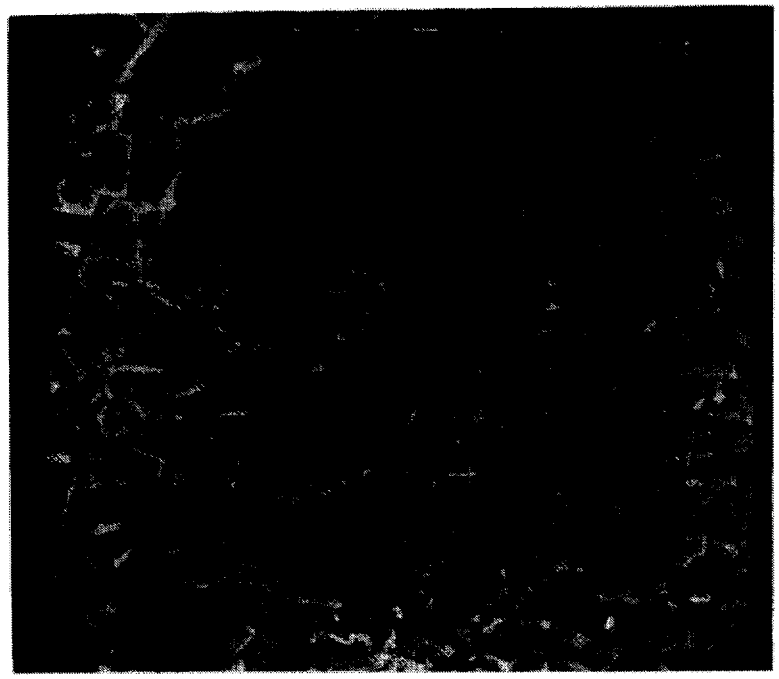
Bottom view unsupported MFI film, side directed to teflon surface during hydrothermal synthesis. (magnification 600x)
FIG. A6.3
Top view unsupported MFI film, grown on teflon (magnification 200x)
FIG. A6.4

MODULE CONTAINING ZEOLITE-BASED MEMBRANE AND PREPARATION THEREOF

FIELD OF THE INVENTION

The present invention relates to a gastight film of zeolites, a zeolite-based membrane, a module provided with such a membrane, a method of producing such a membrane module and the use thereof for a number of processes.

BACKGROUND OF THE INVENTION

Zeolites and related crystalline materials are known for their properties in the field of separation of gases and/or liquids and of catalytic conversion. Because of the mechanical requirements set for commercial use, membranes are particularly used in the form of modules, i.e. in a membrane housing, in which a zeolite layer is applied to a suitable support.

Different variants have already been proposed for the production of modules, which are all based on the use of auxiliary layers and/or complicated procedures for the production of the membrane and/or the module.

The problem underlying the invention is how to find a novel and simple method of producing membranes and/or modules. A great problem in high-temperature uses is the sealing of the module by which feed and permeate are separated from each other. One possibility is the separation of the locations of sealing and separating. The temperature at the place of the separation layer is adjusted to the desired value, while a part of the module is made gastight. Over this part a temperature gradient can then be provided so that sealing technology already known for low-temperature modules can be applied. A drawback of this solution is that a much complexer module design is required in which the different parts of the separation equipment are to be kept at strongly varying temperatures. This is possible by providing a cooling system (e.g. water cooling) in a fully heated apparatus.

Another possibility is to make use of bonding technology in which too large a difference in compatibility between two materials (difference in thermal expansion coefficients) is removed by providing different intermediate layers, each being the support/membrane system on the one hand and the module housing on the other hand. Such technology has been patented on behalf of the firm of Velterop B.V. of Heerhugowaard (North Holland, The Netherlands), in which a five-layer system is required for a gastight connection of the ceramic support/membrane material ($\alpha$-alumina and modified $\gamma$-alumina) with the stainless steel module housing. Although such a technology can be excellently formulated per se and can in principle be applied without limitations to a wide variety of materials, a large scale application will prove to be difficult in practice. It is to be considered in this connection that a number of films must be applied in a very homogeneous and uniform manner over relatively large surfaces. Moreover, such a bonding technology will be rather expensive because the different process steps must be taken in succession and an error in one of the process steps results in a complete malfunction in the separating apparatus.

An alternative to be considered with regard to the above compatibility problem is to provide a single layer of a flexible material, which material, however, is stable under process conditions. The flexible material, which can be characterised as a material having a low modulus of elasticity, is provided between the incompatible materials and functions as such as a buffer for taking all the built-up stresses. Here, too, it is of course possible to apply a number of layers, of which particularly the amorphous films (glasses, glazes, enamels) are preferred in connection with the intrinsic flexibility of such materials. Moreover, such materials are not tied down to the chemical composition, so that it is possible to fully adjust the material properties to the desired sealing.

However, all the above solutions are based on the idea that the materials for the membrane film and the porous support on the one hand and the module housing on the other hand are totally different and incompatible. This is indeed often the case because the module housing is frequently made of stainless steel, whereas for ceramic membranes, such as silicon oxide, aluminium oxide, zirconium oxide or titanium oxide, ceramic porous support materials are often also required to obtain a (thermo)mechanical stable film. This means, however, that for the membrane synthesis alone a number of process steps are required in which often a number of layers having different porosities, pore diameters and surface roughness are provided on each other. In fact, two problems are to be solved at the same time because on the one hand a membrane film having the desired pore radius and pore size distribution must be formed while on the other hand the membrane film must be accommodated in a module in such a manner that application at high temperature is possible. As appears from the above, applying a number of layers for both the membrane film and the gastight sealing may require specific process conditions so that a certain sequence of process steps must be formulated.

It is an object of the invention to provide novel membranes in which the above problems do not arise or occur to a lesser extent.

DISCLOSURE OF THE INVENTION

A first aspect of the invention is concerned with a zeolite file which is continuous and gastight, and which can be converted by calcining into a thermostable membrane, i.e. stable up to at least 600° C. This film is generally located on a porous support which preferably consists of a coarse-porous underlayer and a fine-porous top layer. An example of such a combination is constituted by an underlayer of sintered metal having applied thereto a smooth layer of fine sintered metal fibres. The material used for the metals is preferably a stainless steel, e.g. AISI 316. It is also possible, however, to use other supports, e.g., silicon wafers.

In this connection it is observed that the term gastight indicates that the layer must be substantially gastight. The possibility of small defects cannot be ruled out completely. It is important, however, that the degree of gastightness is such that through the possible defects the gas transport is considerably less than the transport through the micropores of the final membrane. It is further important that the layer is continuous, which means that the zeolite crystals are connected to each other and are not separated from each other by other materials.

A next aspect of the invention lies in the membranes themselves, as well as in the use thereof in modules. Variants of these aspects of the invention are given in the claims. An important variant is that in which the orientation of the zeolite crystals in the layer is completely or almost completely the same, so that it is possible to confine to relatively very thin films. Suitable values range from 100 nm to 200 µm. The degree of homogeneity of orientation can be determined in the X-ray diffraction pattern. As shown in FIG. 24, a fully homogeneously oriented material has a pattern consisting of a few high peaks, with no signals from amorphous material being present.

An important advantage of the zeolite films according to the invention lies in the particularly high flux obtainable therethrough. Surprisingly, it has been found that with the membranes according to the invention a flux is obtained which is substantially (a factor of 10 to 20) higher than those skilled in the art would expect in view of the structure.

A further advantage of the invention is the high degree of temperature resistance of the membrane/support combination. It is possible to expose the materials to repeated large temperature variations within the range of from room temperature to 600° C. without damage or leaks through the membrane. The cause thereof is not certain. The theory may be considered that the top layer of the support and/or the structure of the zeolite crystals are flexible. Another possibility lies in the conditions used during the production of the membranes. Since these are produced at relatively high temperature, a compressive stress occurs in the film upon cooling, to which the material is very resistant. Then a temperature increase merely leads to a decreased compressive stress and only in a much reduced degree to tensile stresses. Most probably, however, the good properties are based on a combination of these aspects.

According to the invention the problems with the construction of modules are simply avoided by selecting for both the porous support and the module housing the same materials or materials at least compatible with regard to material properties. This means that the membrane material only needs to be compatible with the porous support material, which is in principle a problem of little complexity.

Another aspect of the invention is concerned with the selection of the membrane material. By selecting crystalline microporous materials as zeolites (silicates or aluminosilicates, such as ZSM-5) or generally molecular sieves (e.g., aluminium or gallium phosphates) a membrane film having the desired pore radius and pore size distribution can be formed in one process step. Such crystalline structures are normally prepared under hydrothermal conditions in relatively strongly alkaline medium. Hence stainless steel as the porous support material is a good choice. For metals porous/non-porous parts can rather easily be bonded together, with great freedom of shaping. Thus the construction of a module having a relatively large specific volume is easy as compared with ceramic materials, while the ductile character of the material, together with the stability in aggressive media and high temperature, promotes a prolonged service life. In general, however, the compatibility between the two materials (support and membrane film) is poor.

It is known that for applying a ceramic layer to a metal surface enamelling is the solution. Here a chemical reaction often takes place between ceramic and metal so that an intermediate layer is formed which is very conducive to the bonding between the two materials. Nevertheless, the mechanic stability of such films is often poor, although the ceramic layer is of such a composition that the difference in thermal expansion is slight. There are examples of ceramic films on metal substrates such as passivating layers (aluminium oxide). These, however, are relatively thin films having a thickness of not more than a few micrometers, which, moreover, are amorphous.

It is also known that zeolites on metal substrates can be stably provided by way of in situ growth under hydrothermal conditions. These, too, are only thin films having a thickness of not more than a few micrometers. It will be clear that such a thin film can only be provided as a connected, i.e. fully covering film if the substrates are very flat and preferably tight. This is supported by the often mentioned applications of such composites as sensors or supported catalyst systems (monoliths).

For a membrane application a fully covering film is required by definition, which has not even for ultraflat tight substrates been realised so far. Moreover, after the formation of the zeolite or molecular sieve film on a tight substrate the support is to be treated in such a manner that it allows sufficient through-flow. If the originally tight material is provided with pores only in places, the advantage of a very thin film will be lost. In fact, the free membrane surface is only a fraction of the surface present and the effective diffusion distance will be many times larger than would be expected on the basis of the thickness of the zeolite film. Moreover, such an approach requires a very selective and properly controllable removal of the substrate material because the thin zeolite film can be damaged very easily.

In this connection it is observed that the (thermo) mechanical stability of a thin unsupported zeolite or molecular sieve film is probably poor, particularly because a membrane application is almost unexceptionally based on a pressure difference as moving power. This need not be the case for hollow fibres having a sufficiently small diameter. However, as a result of their own weight and the length in the module such hollow fibres are very likely to experience sagging to such an extent that rupture is highly probable. Moreover, unsupported zeolite films are again connected with the above problem with regard to the construction in a high-temperature module.

It follows from the foregoing that preference is given to supported zeolite films directly proceeding from a porous support. In order to avoid compatibility problems, it is advantageous to make use in the entire equipment of two materials only: the porous/non-porous support material, and the separating film, in this case crystalline molecular sieves. Moreover, it still does not seem possible to grow very thin films as fully covering layers so that the thickness of the separating layer is relatively large (up to about 1000 µm). Now it is generally known that the crystallisation of zeolite or molecular sieve crystals of such sizes proves to be possible for a few crystal types only. Particularly with regard to the ZSM-5 (MFI) type and the silicon-rich version silicalite it is known that large crystals (>500 µm) can be grown. Moreover, the three-dimensional pore structure is very suitable for the growth of a polycrystalline film, with the pores being properly connected throughout the film, thus enabling permeation through the film. A drawback of this zeolite type is that large crystals are almost unexceptionally formed by means of a quaternary ammonium ion, tetrapropyl ammonium, TPA, which after synthesis finds itself enclosed in the crystal structure. Hence the pore structure of ZSM-5 is fully inaccessible to other molecules, even to hydrogen and helium.

The known method of removing these TPA molecules so as to open the pore structure is by means of calcination at often 500° C. For small crystals (up to a few tens of micrometers), this generally causes no problems. It is known, however, that for larger crystals cracking occurs during the calcination process. This results in mesopores which can strongly limit the molecular sieve effect of the membrane.

Surprisingly, it has now been found that even very large crystals of about 250 µm in length, which are properly bonded to the stainless steel substrate through hydrothermal growth, are not susceptible to cracking during calcination up to 400° C., while even so the pore structure becomes fully available. Also continuous ZSM-5 films having a thickness of about 60–80 μm, which have been grown on a porous stainless steel substrate, prove to be stable.

Even for such thick films it turns out difficult to obtain a fully covering layer. However, a proper check on the crystallisation method is easy for ZSM-5 because the film must be gastight before baking out. If this is not or insufficiently the case, however, the zeolite material can be removed again by a washing treatment. The same applies to a malfunction in the membrane. e.g., if the micropores prove to be clogged and regeneration by means of calcination or extraction would give no improvement, or if ultimately larger pores have nevertheless been formed in the zeolite film.

The metal support preferably consists of a fine top layer having only a slight roughness. An optimum configuration for the membrane module consists of a two-layer support in which a thin layer of fine metal fibres is applied to a very coarse-porous support. Consequently, the support is very flat, which facilitates the growth of a continuous zeolite film. Thus modified supports are excellently capable of through-flow, but even so they can be produced with great freedom of shaping. A preferred configuration makes use of porous metal wires provided with the top layer mentioned above. The other way round, a monolithic structure of sintered porous stainless steel, provided with the same top layer of metal fibres, can be applied too. In the first instance, the module is so constructed that the pores are nowhere larger than those of the thin metal top layer. The underlayer preferably has pores of from 5 to 5000 μm and is provided with a top layer having pores of from 0.5 to 10 μm, which top layer is not thicker than 10 μm and preferably not thicker than 10 μm.

During the first step the zeolite synthesis mixture is placed in the module, in which the flanged joint to be used is particularly teflon, which is inert during the hydrothermal conditions. After synthesis a check is made whether a connected zeolite film is formed by means of leak tests. Subsequently, the zeolite film is calcined at 400° C. for at least 15 hours with 1° C./min heating and cooling.

Depending on the composition of the synthesis mixture, the kinetics and thermodynamics, those skilled in the art can regulate the degree of orientation of the zeolite crystals. In the case of nuclei being present on the surface, a vertical orientation will often occur. When a gel layer is used on the surface, the orientation is horizontal.

BRIEF DESCRIPTION OF DRAWINGS

FIG. A1.1 shows the ZSM-5 crystals prior to calcination on the porous support of Example 1.

FIG. A1.2 shows the ZSM-5 crystals after calcination on the porous support of Example 1.

FIG. A5.1 through FIG. A5.3 show the film of MFI on the support of Example 5.

FIG. A5.4 through FIG. A5.7 show cross sections of the film of MFI on the support of Example 5.

FIG. A6.1 through FIG. A6.4 show the film of MFI on teflon of Example 6.

FIG. 7 through FIG. 20 show results of various uses of the module prepared by Example 3.

Figure 21:
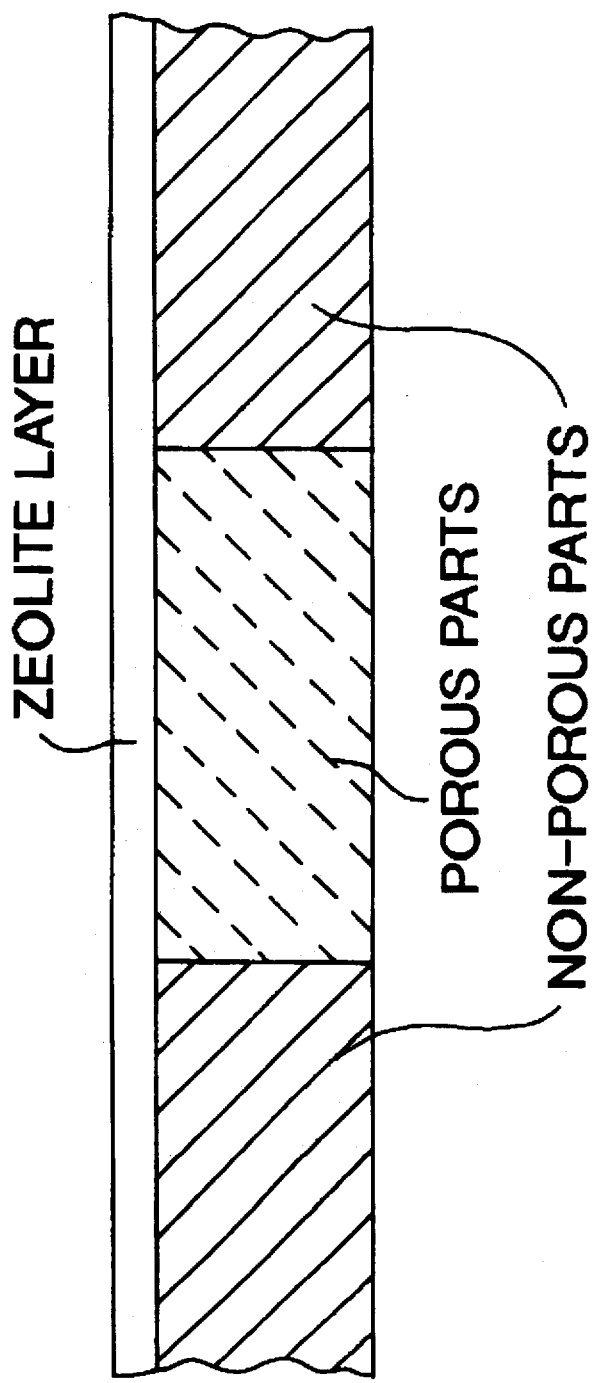

FIG. 21 shows a cross section of the membrane.

Figure 22:
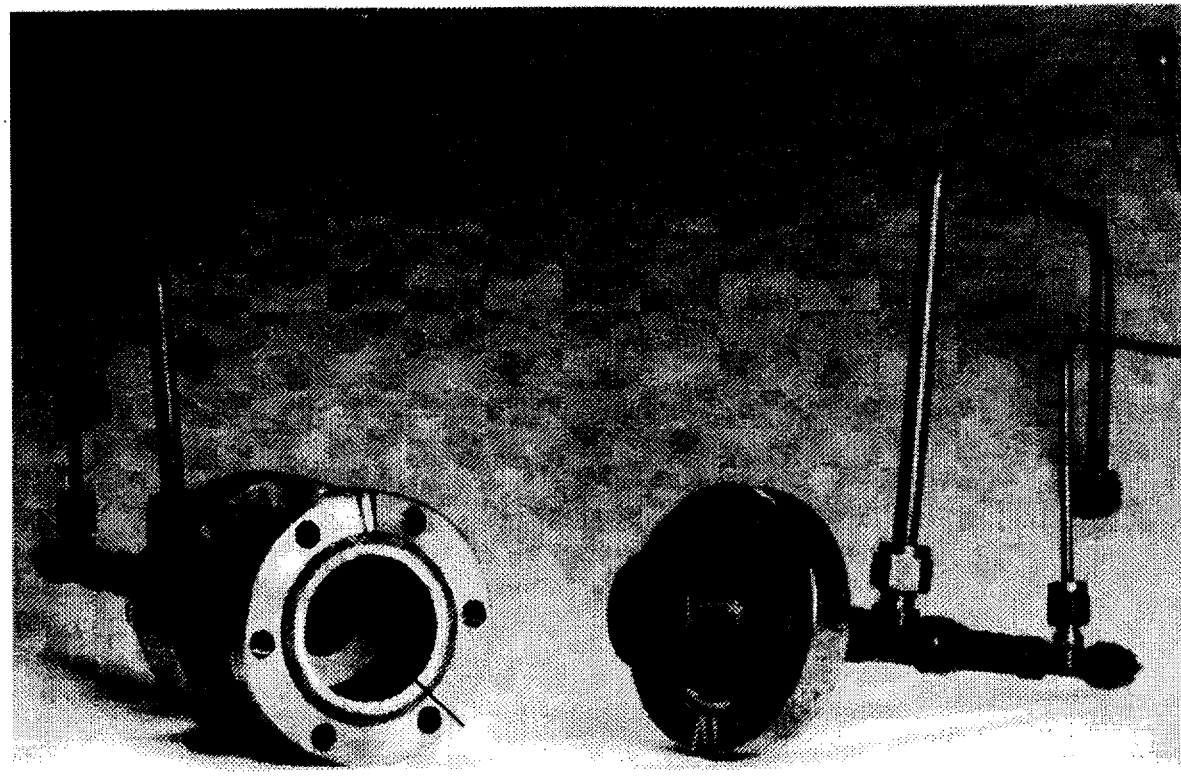

FIG. 22 shows an example of the use of the module containing the membrane.

Figure 23:

FIG. 23 is a EM photograph of the zeolite film of Example 3.

Figure 24:
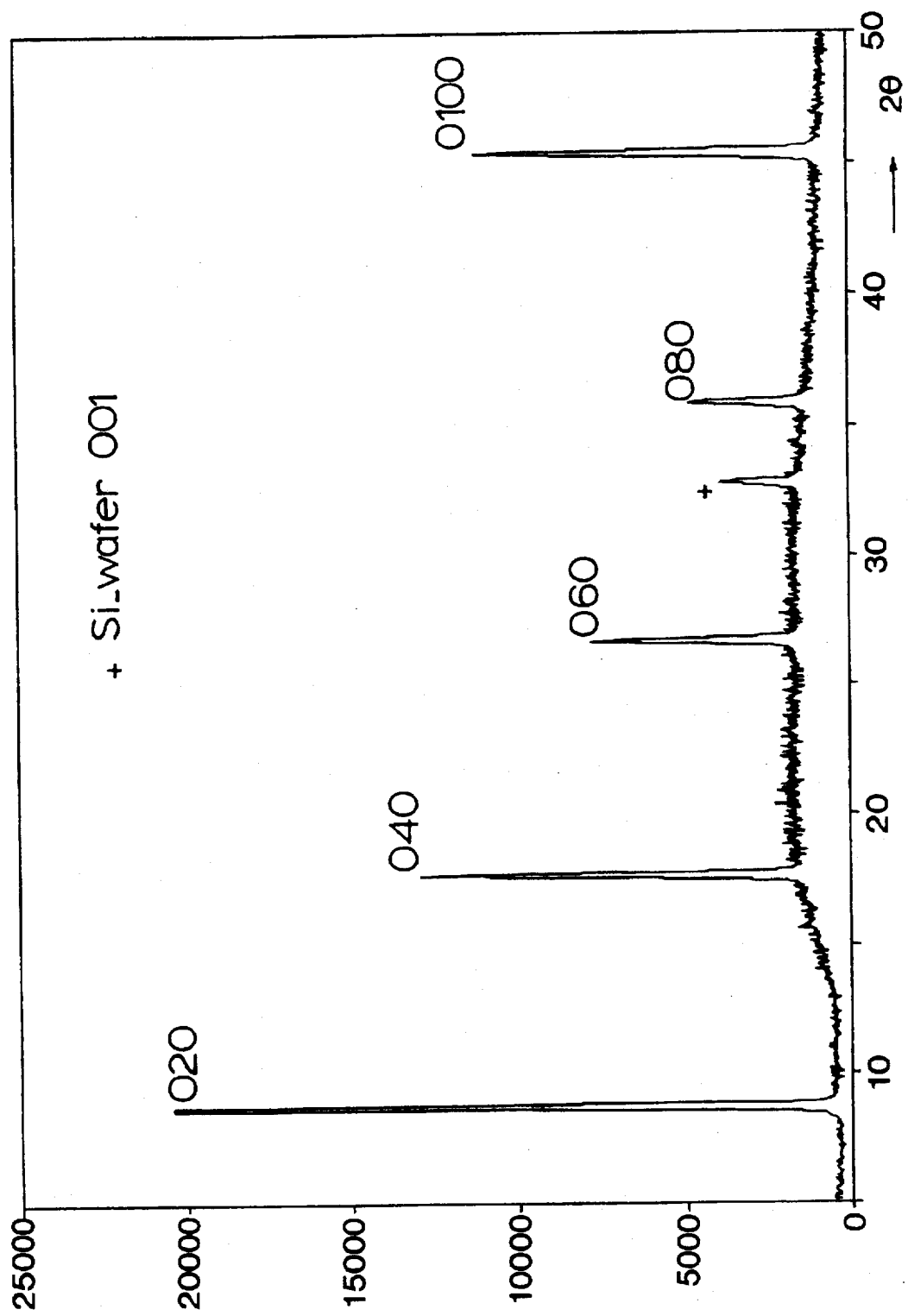

FIG. 24 shows the x-ray diffraction pattern of the zeolite film of Example 3.

EXAMPLES

1. Growth of large crystals on a stainless steel porous underlayer

A solution of 0.6 g Aerosil 200 (Degussa), 1.2 g NaOH (Baker), 8 g TPABr (CFZ, Zaltbommel) and 30 g demineralised water are combined and homogenised for 5 hours at room temperature.

A coarse-porous sintered metal (stainless steel) support (Sika R3, Krebsoge, Radervormwald, Germany) is placed in a 35 ml teflon-coated autoclave, together with the synthesis mixture, and allowed to stand for 165 hours at 180° C. The autoclave is then cooled and opened. The metal support is washed with water and ethanol and dried. Large crystals of the ZSM-5 (MFI) type prove to have grown on the support (Photograph A1.1).

The support is then calcined in a furnace at 400° C. for 5 hours (heating and cooling rate 1° C./min). The crystals are checked with light and electron microscopy for the presence of cracks and prove to be completely crack-free (FIG. A1.2).

2. Construction of stainless steel module

The support used is a porous two-layer support (diameter 15 mm; thickness 3 mm) of Krebsoge (Sika R/F 1), provided with a thin top layer of metal wool ("Fasern"). This support is fixed in a tight stainless steel sheet (diameter 50 mm) by cooling the porous sheet to liquid nitrogen temperature, while the tight stainless steel support is heated to 400° C. By means of rapid assembly, while both parts practically maintain their own temperature, the two parts form one whole at room temperature and can then be brought to any desired temperature.

The tight metal sheet is provided on both sides with a concentric slit. By means of a gold weld, two CF40 flanges (Leybold-Heraeus) with a pipe socket (40 mm diameter) are assembled (see FIG. 22).

3. Synthesis of ZSM-5 (MFI) film in stainless steel module

The volume on one side of the module of Example 2 is filled with a piece of teflon and closed with a fitting CF blind flange (a teflon ring serves as a flanged joint). On the other side of the module, demineralised water is provided in the first instance (15 ml), and the module is also closed on this side with a CF blind flange and a teflon flanged joint. The module is allowed to stand for 10 hours at 180° C. After cooling the upper side is rinsed with water, while the underside is still closed.

A mixture of 2.11 g TPAOH (40% in water; CFZ, Zaltbommel), 0.33 g Aerosil 200 (Degussa), 2.22 g TPABr (CFZ, Zaltbommel) and 12.23 g demineralised water is homogenised for 5 hours at 25° C. The mixture is poured into the module and closed again by means of a CF blind flange and teflon ring. The module is placed in a furnace for 45 hours at 180° C. The module is cooled, opened on both sides, washed with water and ethanol and dried at room temperature. An MFI film is crystallized over the total inner surface of the module where metal and synthesis solution have been in contact with each other.

The module is then placed (see FIG. 22) in a furnace having on both sides a fitting CF flange, with a gas inlet and outlet being arranged therein. Copper is used as flanged joint. When on one side (feed side) 100% neon (1 bar total pressure) is applied, while on the other side (permeate side) 100% helium (total pressure 1 bar) is passed along, there proves to be no material transport through the membrane. Measurement of the amount of transported material gave a value $<2.10^{-8}$ mol/m$^2$.s, i.e. below the detection limit of the equipment used. The 'template' molecules (TPA; tetrapropyl ammonium) present in the zeolite (MFI) completely clog the micropores.

Subsequently, on both sides a nitrogen/oxygen mixture (80/20) of 100 ml/min is passed over, while the temperature is increased by 1° C./min to 400° C. and is then maintained there for 15 hours. Finally, the mixture is cooled by about 2° C./min to room temperature.

4. Reuse of metal module

A membrane completely prepared according to Example A3 (calcined ZSM-5 (MFI) film) is provided on the underside with a teflon cylinder and closed as described in Example 3. An aqueous 2N KOH solution (15 ml) is added, and the module is closed with teflon as described in Example 3 and allowed to stand for 6 hours at 180° C. After cooling the washing solution is removed, and the module is rinsed with water. The module is filled with 15 ml water and allowed to stand again at 180° C. After cooling the membrane synthesis is completed as described in Example 3.

5. Growth of an MFI film on a porous stainless steel support

A separate two-layer support as described in Example A2 (diameter 25 mm) is placed in a teflon-coated 35 ml autoclave, together with a synthesis solution for the crystallisation of ZSM-5 (MFI). The synthesis solution consists of 0.51 g Aerosil 200 (Degussa), 1.11 g TPABr (CFZ), 2.12 g TPAOH (40% in water) and 10.54 g demineralised water, homogenised for 3 hours at 25° C. The autoclave is allowed to stand for 47 hours at 180° C. and then cooled. The support is washed with water and ethanol and dried.

A continuous polycrystalline film of ZSM-5 (MFI) covers the complete upper side of the metal support (FIGS. A5.1–3). FIGS. A5.4–7 show the fracture face of the preparation. A continuous zeolite film of about 60 µm is properly bonded to the top layer of the stainless steel support. The film consists of crystals clearly grown together, which seem to be pointlessly connected to each other.

6. Zeolite synthesis without a stainless steel support

A mixture of 22.9 g water, 3.53 g TPAOH (40% in water), 3.76 g TPABr and 0.55 g Aerosil 200 is homogenised for 5 hours at 25° C. The mixture is placed in a teflon-coated autoclave and allowed to stand for 46 hours at 180° C. After synthesis a ZSM-5 (MFI) film proves to have been formed over the complete teflon surface which has been in contact with the synthesis solution. The film is mechanically loosened in the form of small pieces which prove to break easily. Moreover, the film contains large holes (FIG. A6.1). In this case no homogeneous film is formed (FIGS. A6.2–3), but the film side having faced the teflon proves to consist of small crystals with open spaces between them. Located thereon is a more continuous zeolite film resembling the film on the two-layer stainless steel support. The top layer of the unsupported zeolite film consists of large crystals which seem to grow rather separately from each other (FIG. A6.4).

This example illustrates that the presence of the stainless steel support has a favourable effect on the growth of a homogeneous ZSM-5 film. Probably, as a result of the slight separation of metal ions (Cr, Ni, Fe) from the stainless steel support, a concentration of building elements occurs for the nucleation and growth of ZSM-5 (MFI), which actually means that the supersaturation is higher at the metal surface than elsewhere in the solution. Moreover, this experiment shows that exactly on the stainless steel underlayer a homogeneous zeolite film is to be grown. The adhesion of the synthesis solution with teflon is apparently lower than with stainless steel so that gas bubbles formed during the hydrothermal synthesis (steam, propylene, originated as a decomposition product of TPA) are better displaced by the synthesis solution on the metal substrate.

7. Production of oriented zeolite film

By using the method as described in Example 3, but with omission of the addition of TPABr, a zeolite film having a thickness of 200 nm was applied to an Si wafer. As appears from the enclosed EM photograph No. 23 and X-ray diffraction pattern, FIG. 24, there is obtained a layer of zeolite crystals which are all oriented in the same direction.

8. The use of a membrane module

FIGS. 7–20 show the results of a number of uses of the module according to Example 3. The permeation measurements were conducted according to the Wicke-Kallenbach method, with helium as supporting gas (total pressure on either side of the membrane 100 kPa).

Figure 7:
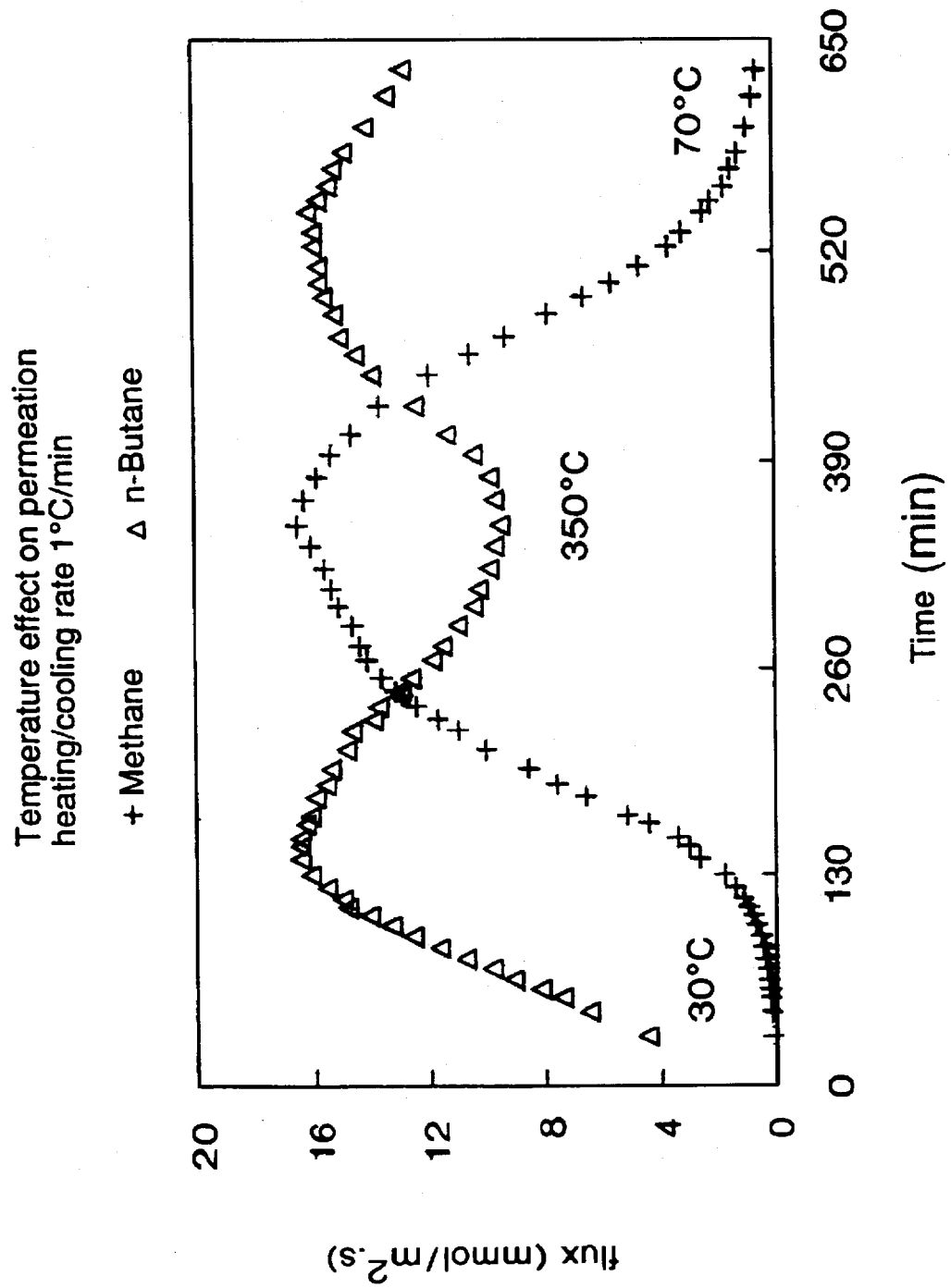

FIG. 7 gives the permeation of krypton during calcination in air, heating rate 1 K/min, $p_{Kr}$=20 kPa.

Figure 8:
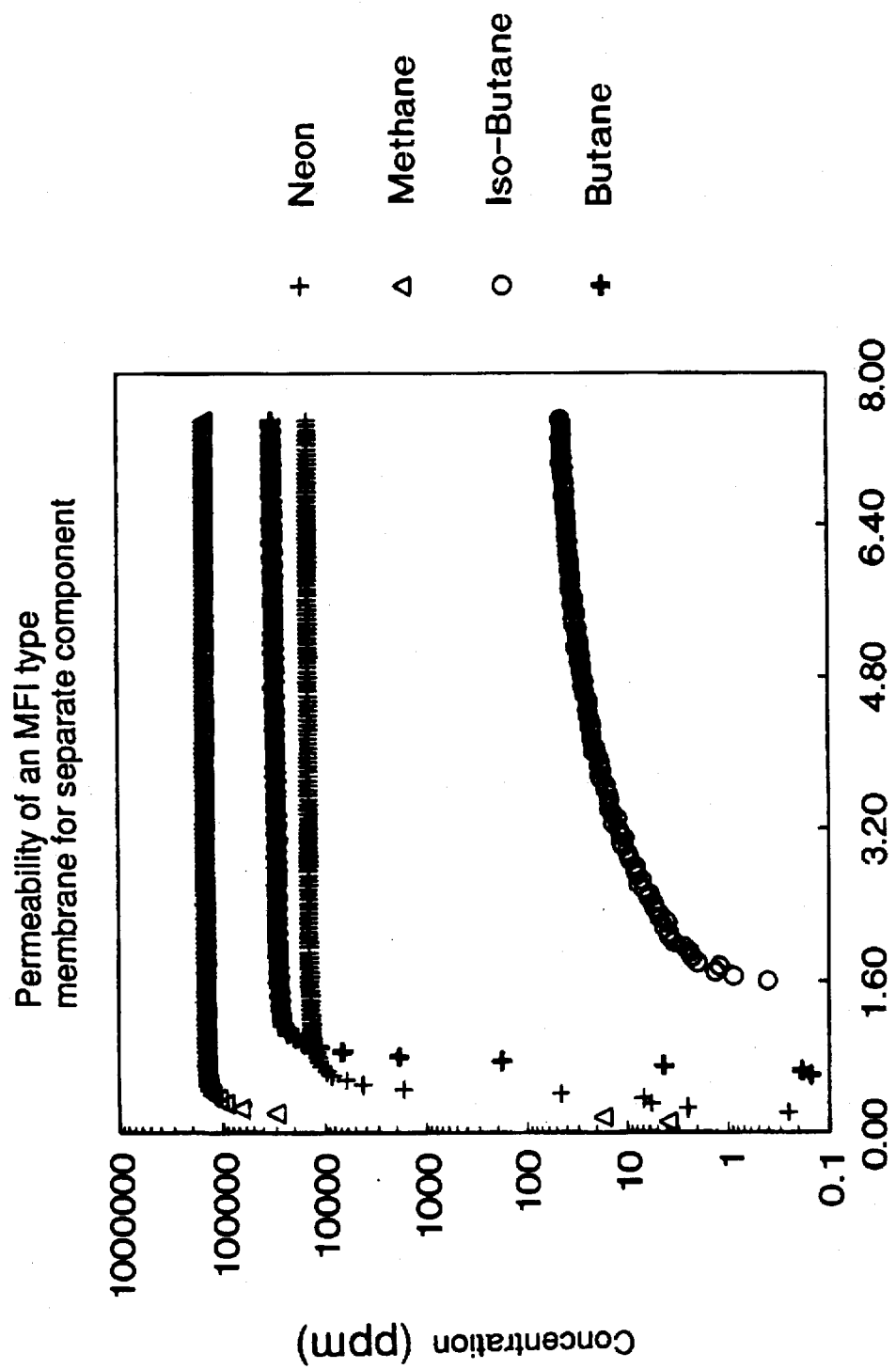

FIG. 8 gives the permeation of two gases separately at 300 K and 50 kPa feed gas pressure.

Figure 9:
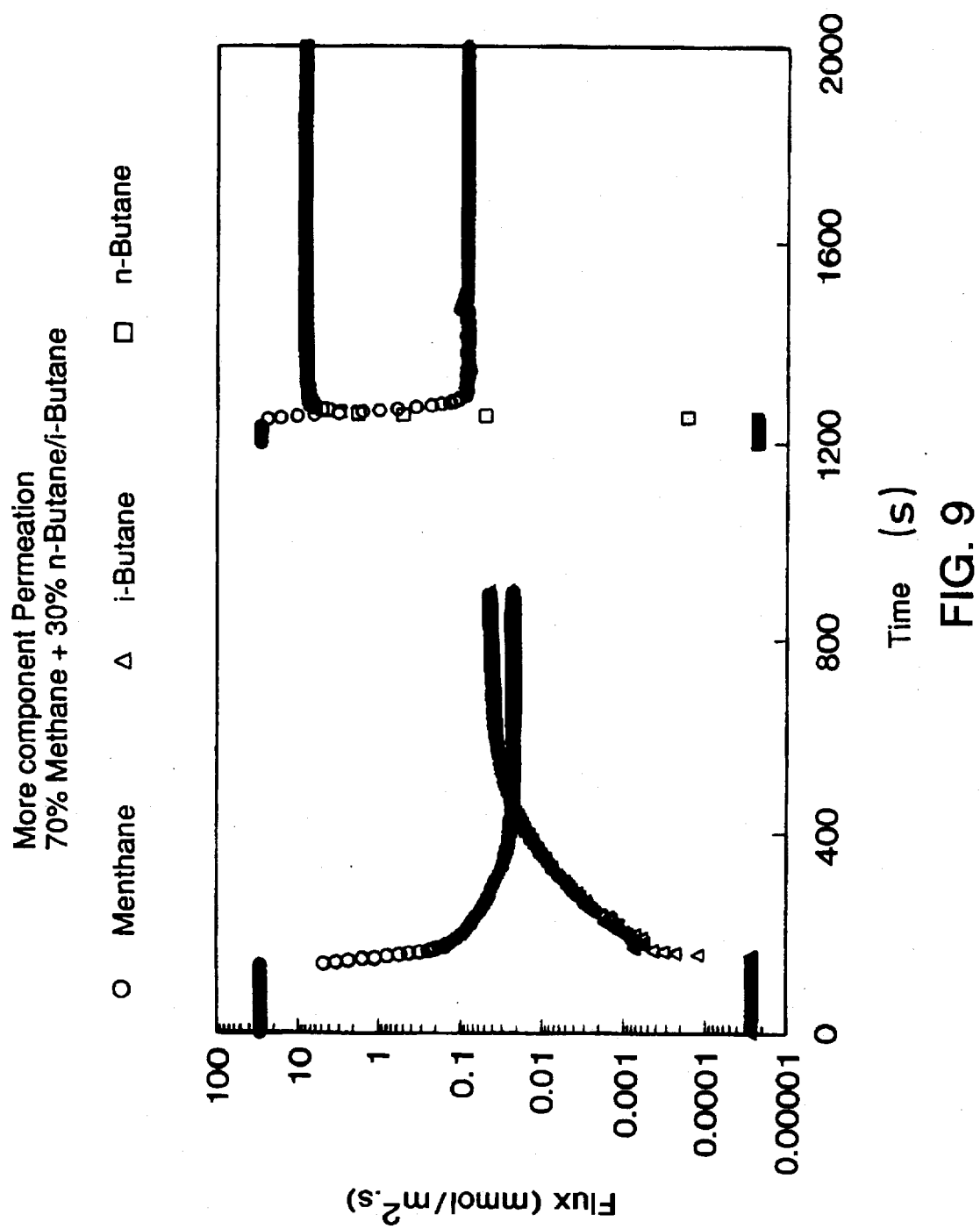
Figure 10:
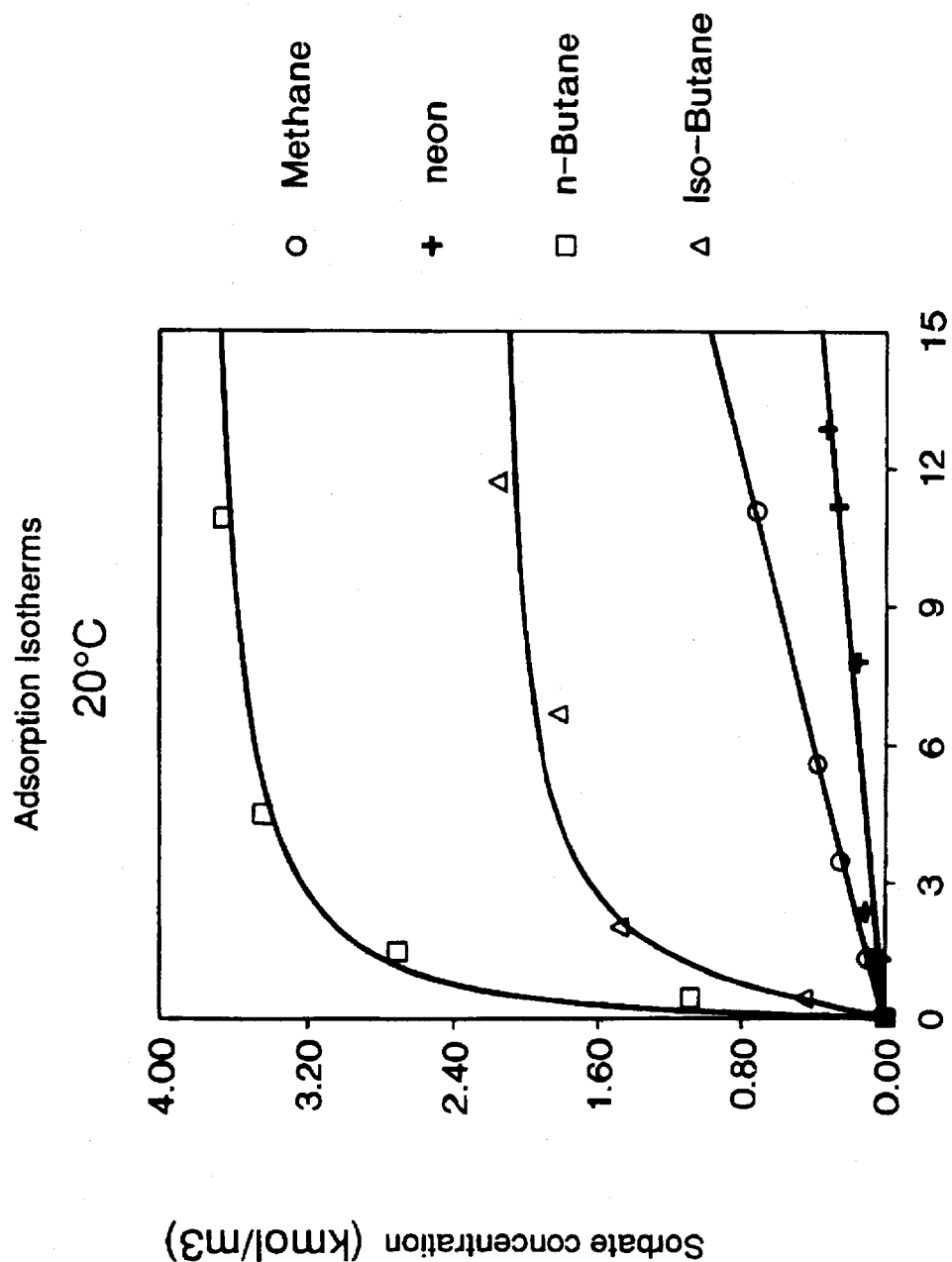

FIGS. 9 and 10 give for a number of gases the flux through the membrane under a number of conditions.

Figure 11:
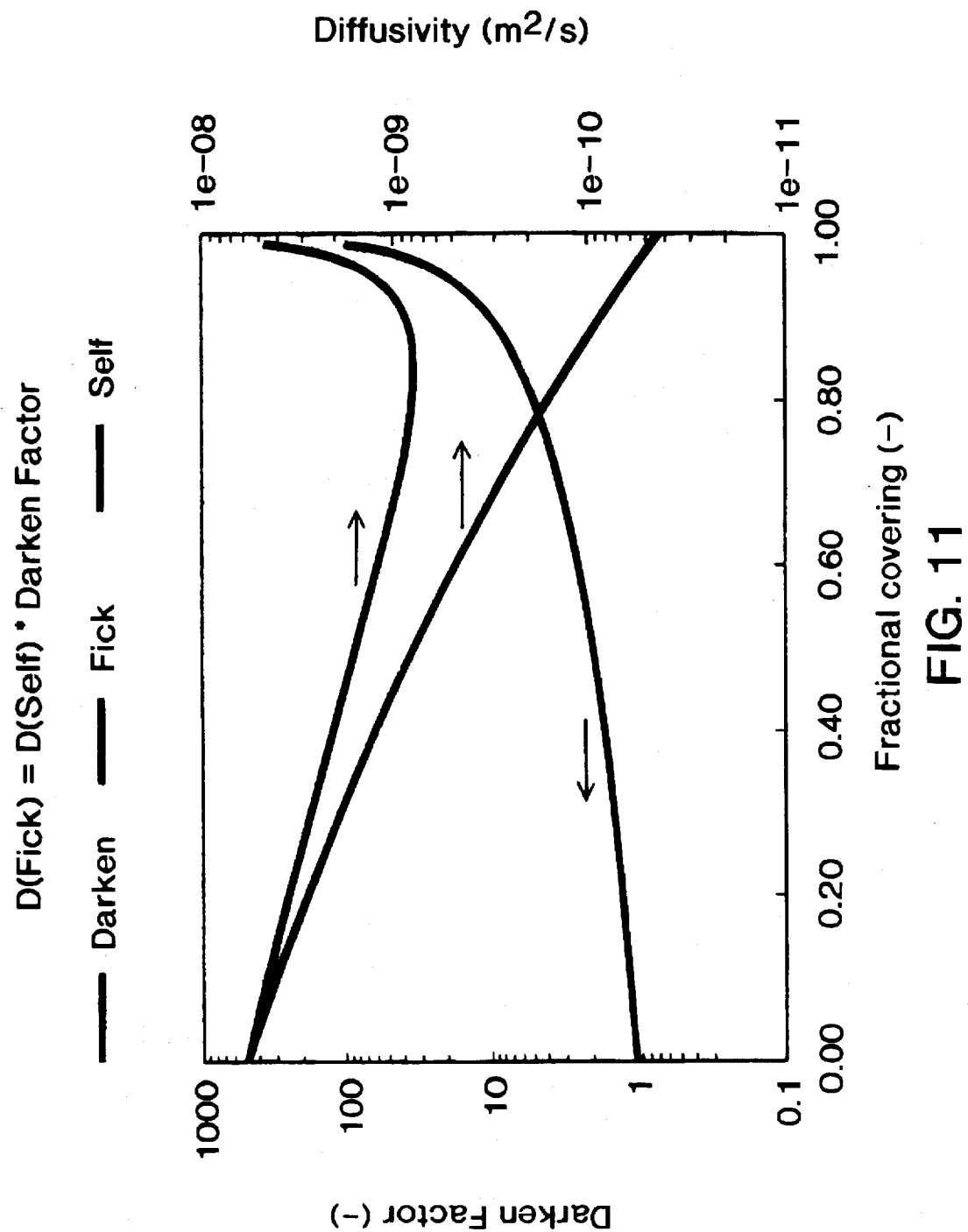

FIG. 11 gives at 300 K the separation of methane and n-butane from the 50/50 mixture thereof at a feed pressure of 100 kPa. $\alpha$>53.

Figure 12:
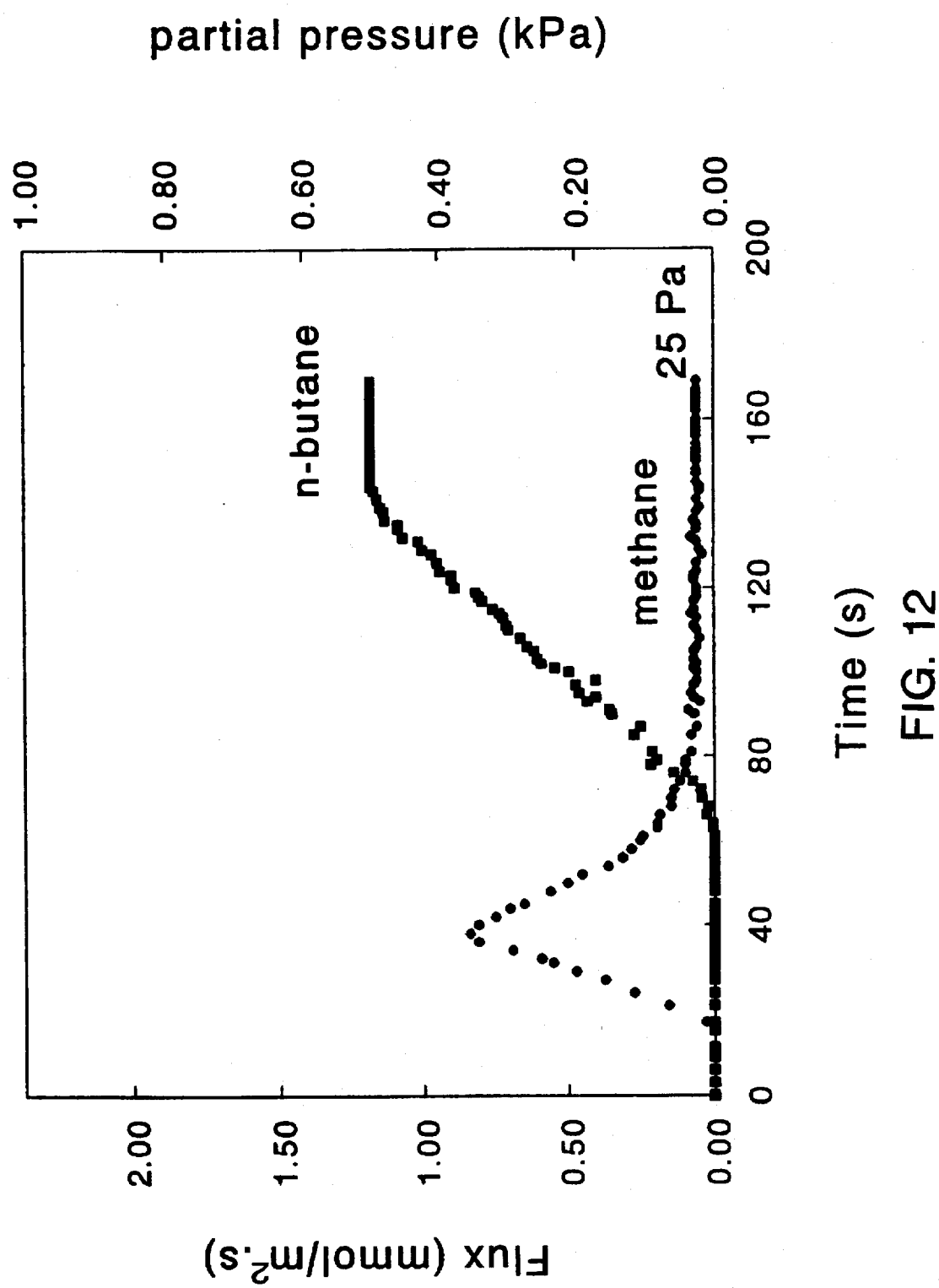

FIG. 12 gives the separation of a 5/95 mixture of n-butane/methane at 300 K. $\alpha$=380.

Figure 13:
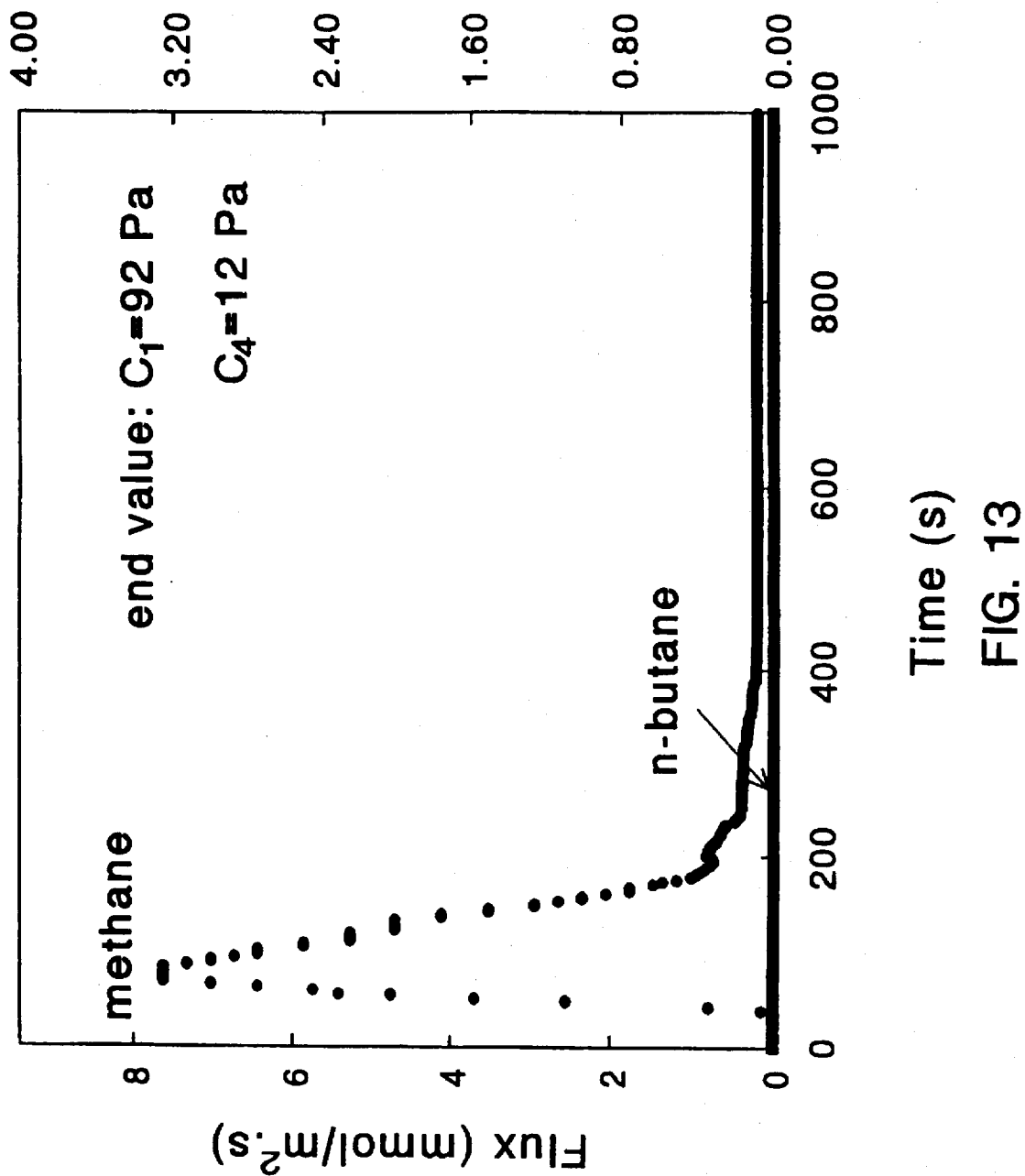

FIG. 13 gives the separation of a 0.05/50 mixture of n-butane/methane (balance helium) at 300 K. $\alpha$=125.

Figure 14:
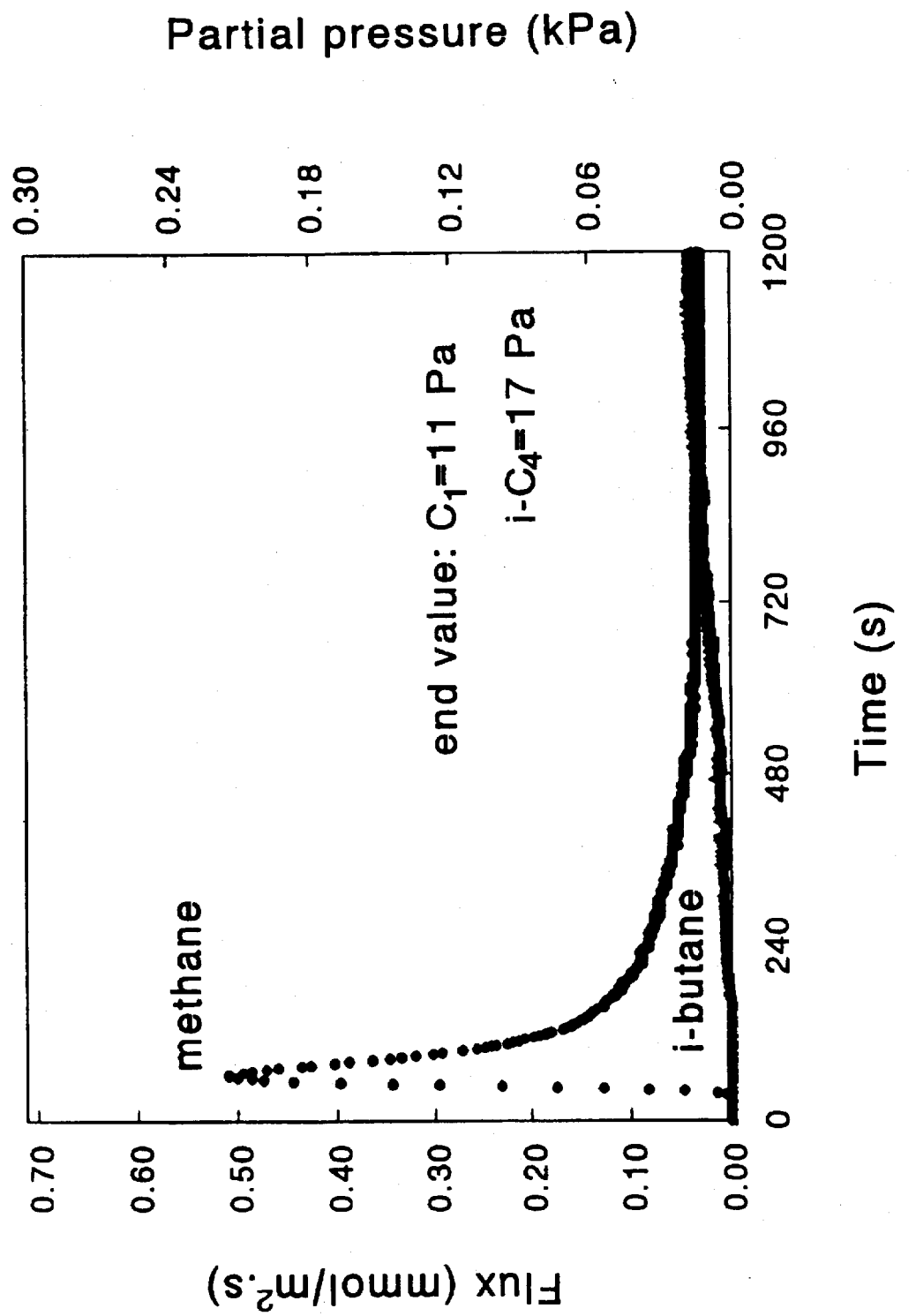

FIG. 14 gives the separation of a 50/50 mixture of isobutane/methane at 300 K ($\alpha$=1.5).

Figure 15:
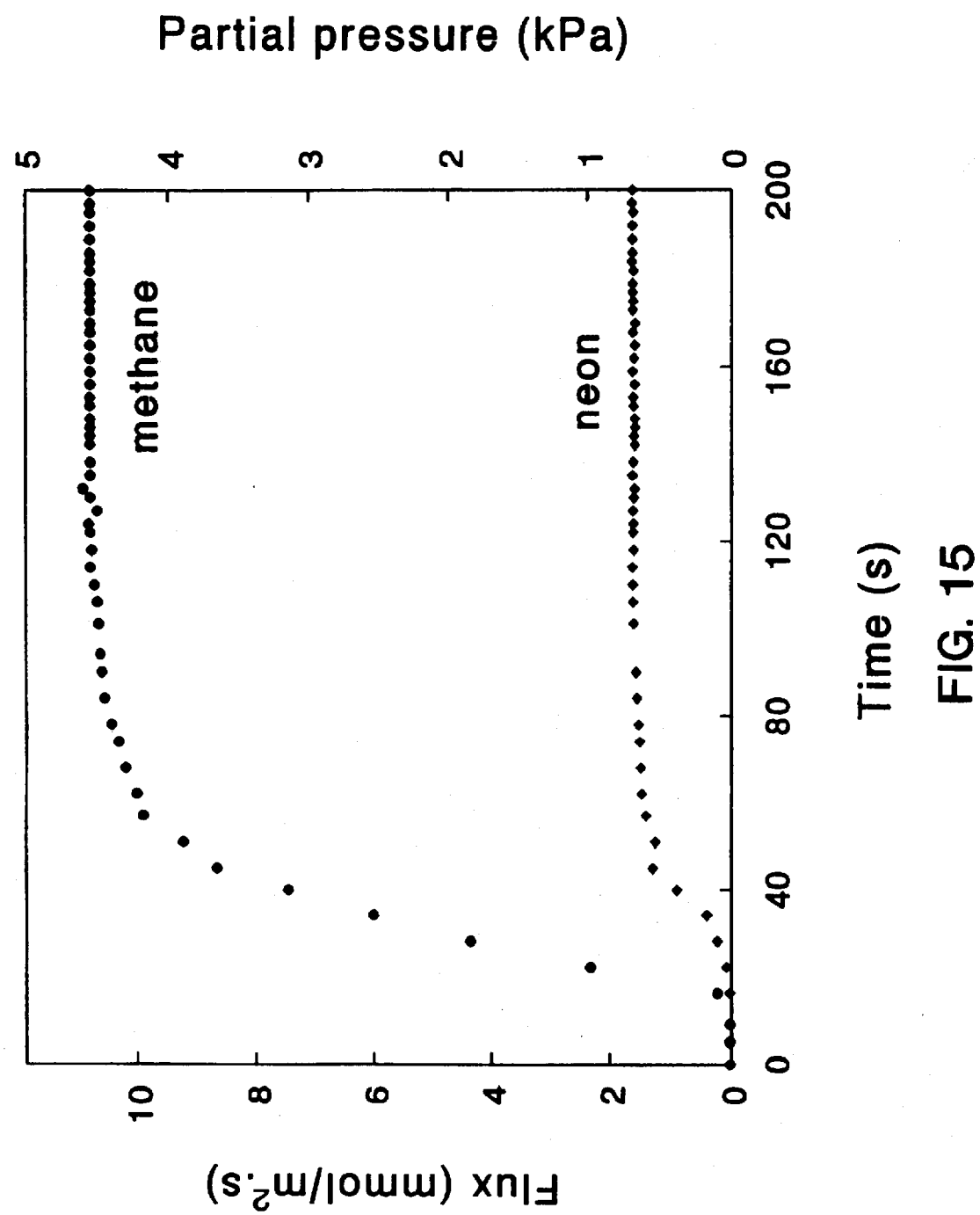

FIG. 15 gives the separation of a 50/50 mixture of neon and methane at 300 K ($\alpha$=7).

Figure 16:
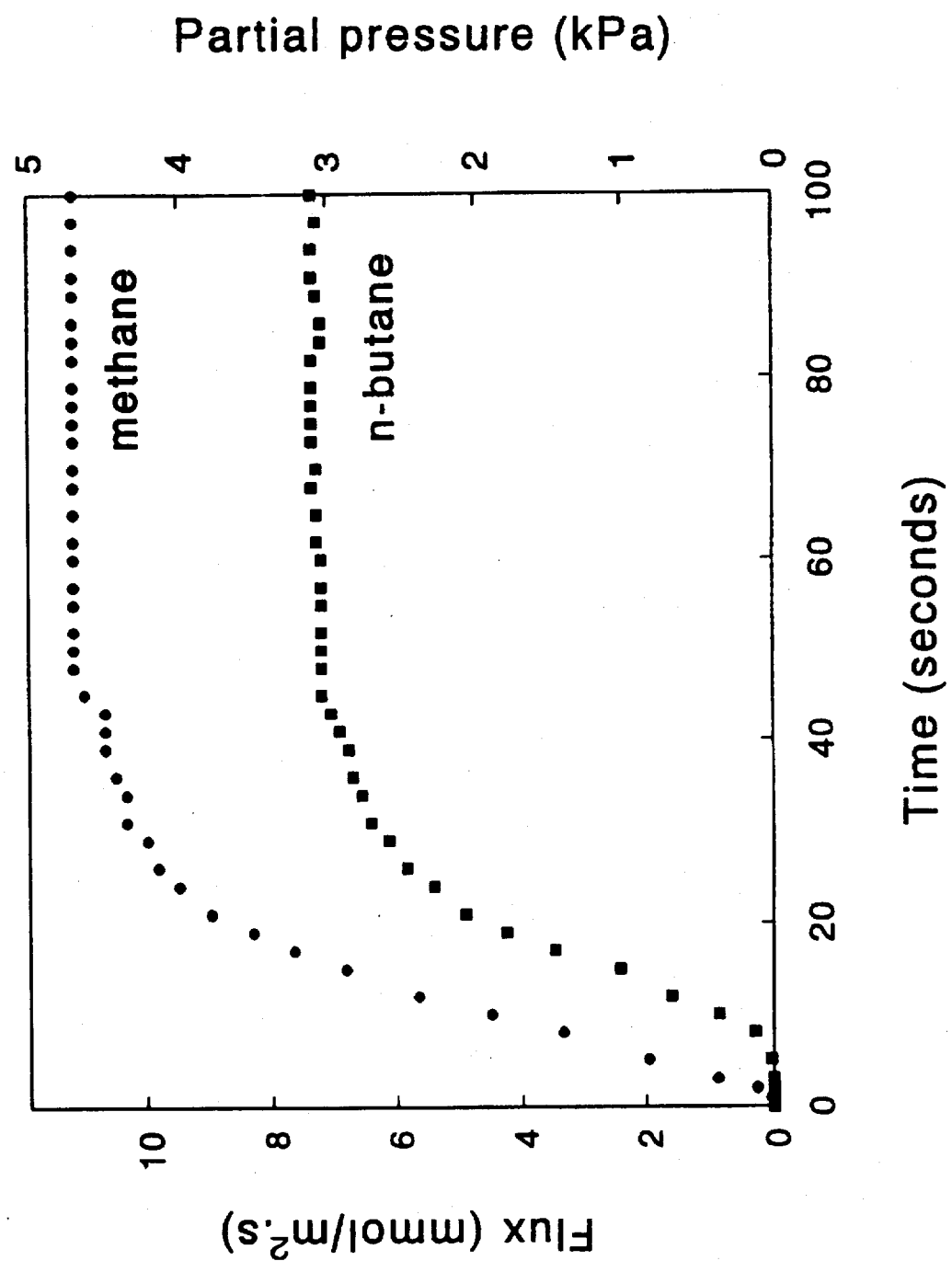

FIG. 16 gives the separation of a 50/50 mixture of n-butane and methane at 623 K ($\alpha$=1.6).

Figure 17:
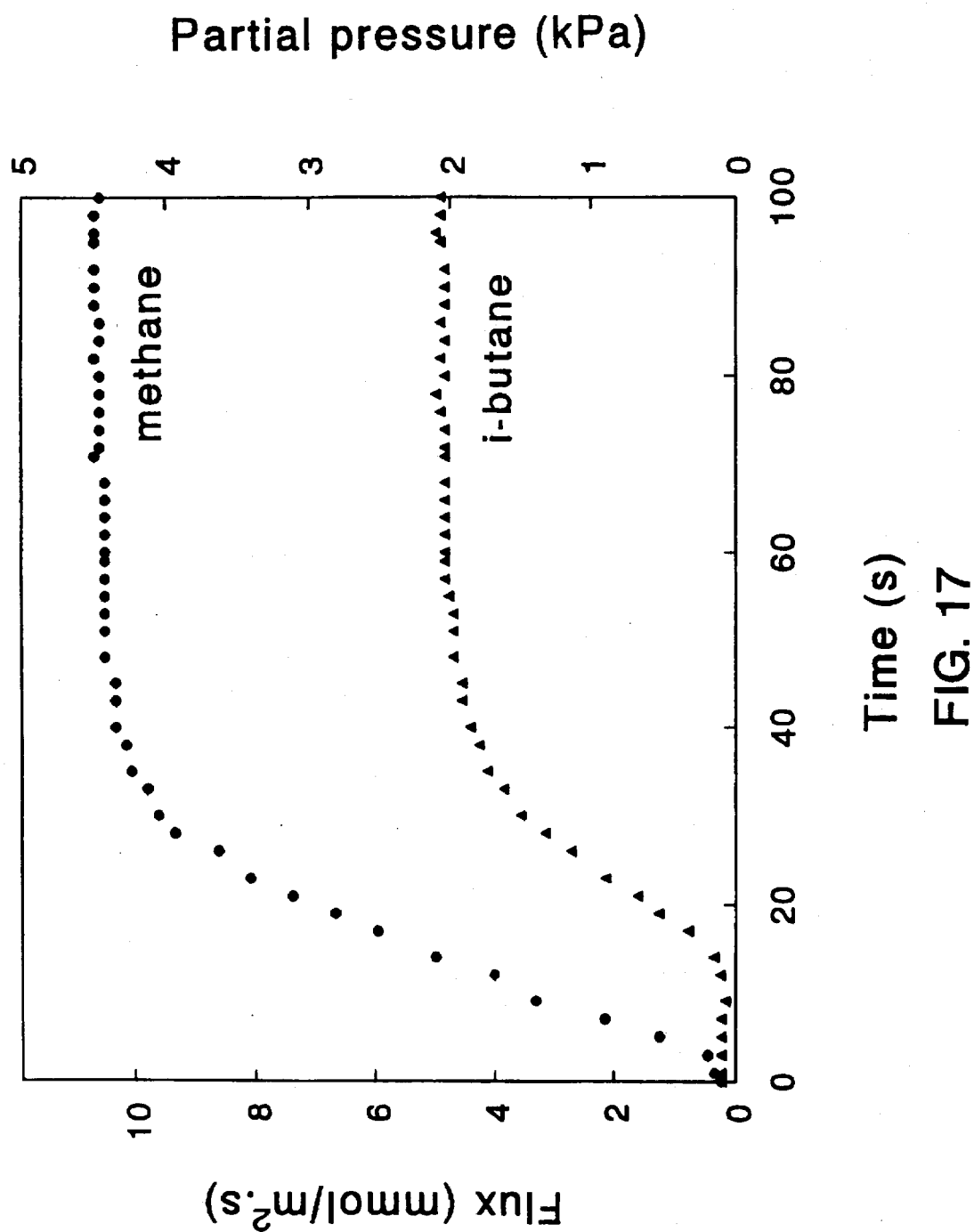

FIG. 17 gives the separation of a 50/50 mixture of isobutane and methane at 623 K ($\alpha$=2.3).

Figure 18:
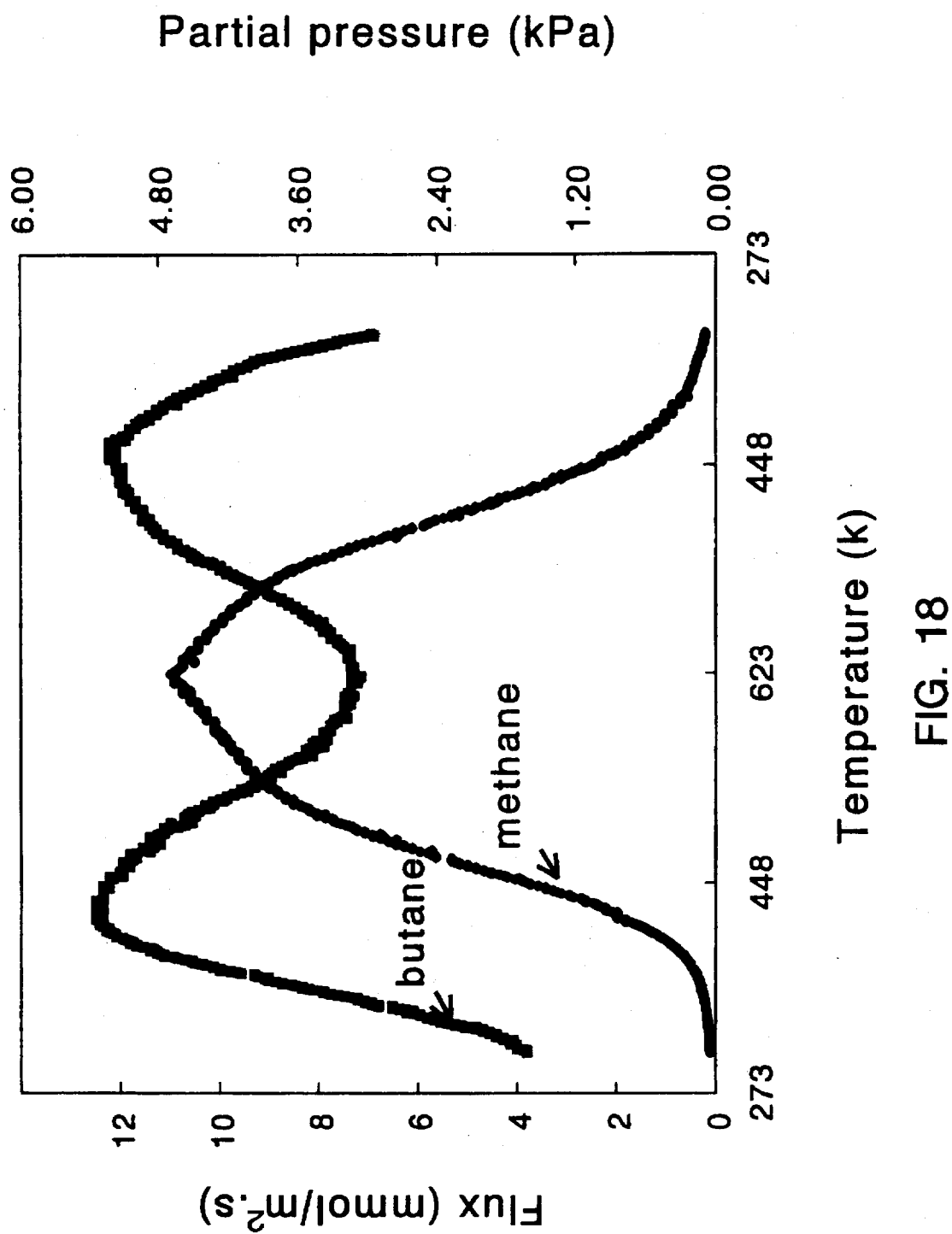

FIG. 18 gives the permeation of a 50/50 mixture of n-butane and methane as a function of the temperature.

Figure 19:
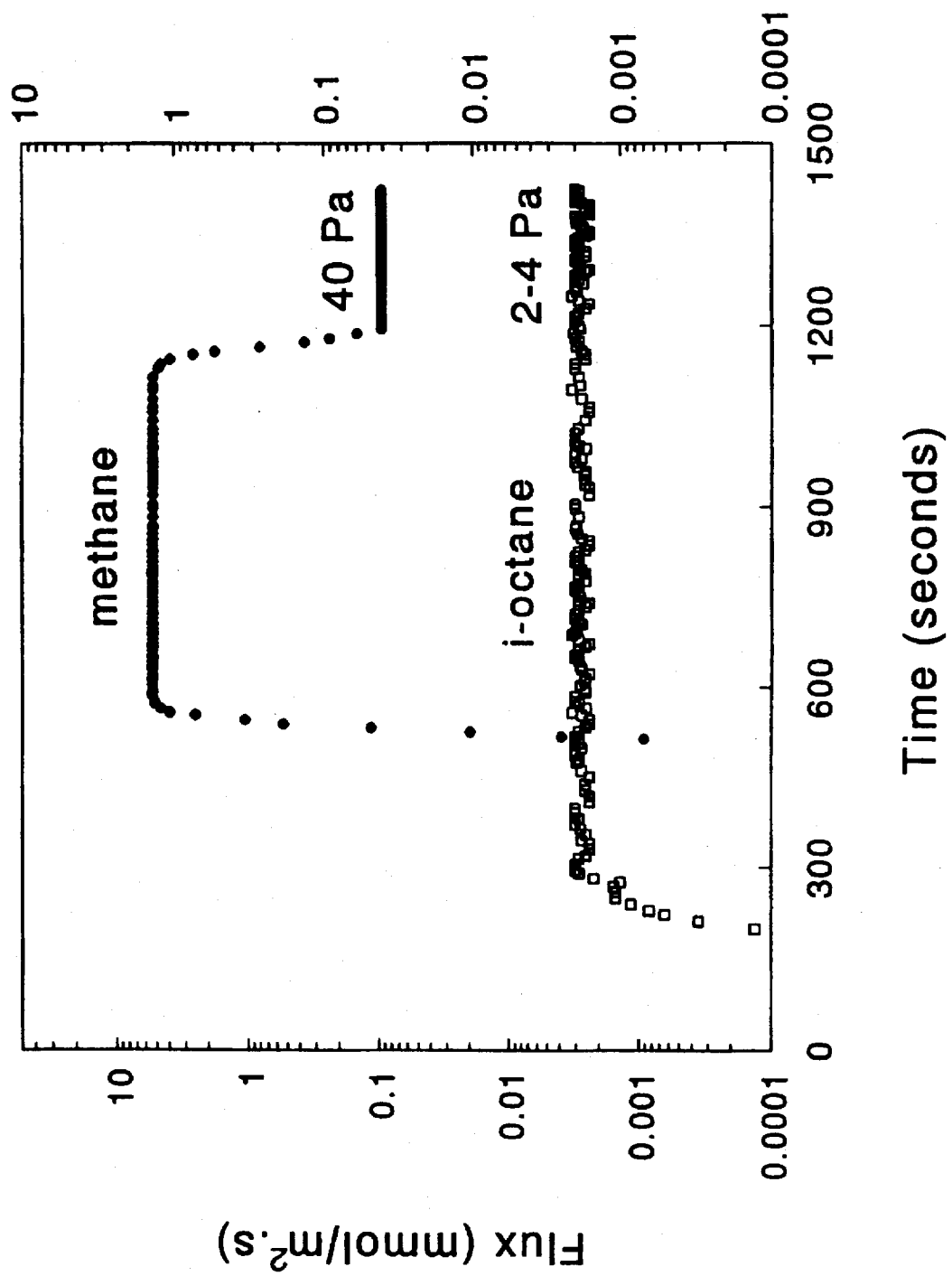

FIG. 19 gives the permeation of 5 kPa isooctane, 25 kPa methane and 25 kPa n-butane. On t=0 was added i-octane, on t=500 methane and on t=1100 n-butane.

Figure 20:
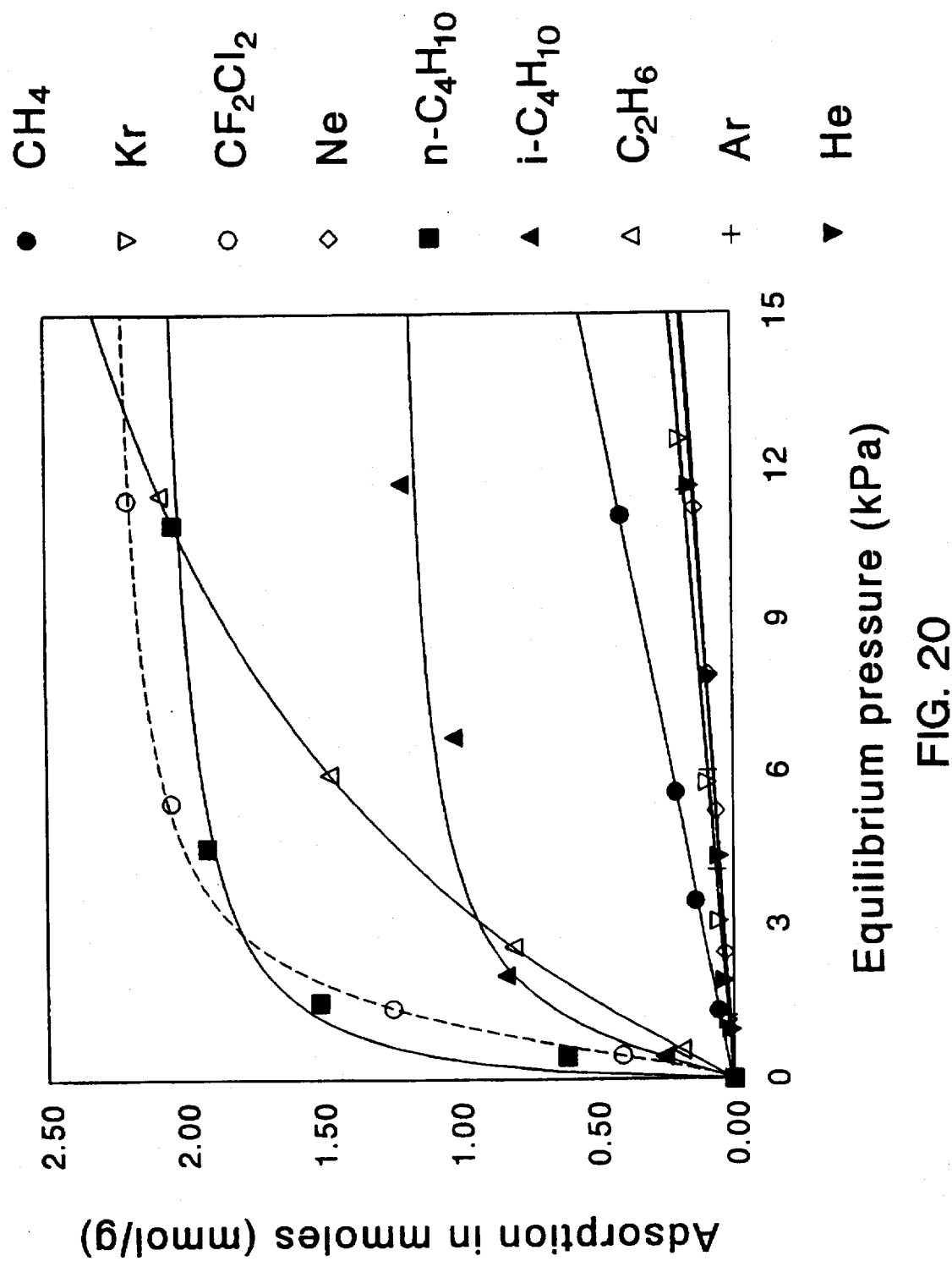

FIG. 20 gives a number of adsorption isotherms of the zeolite.

FIG. 21 roughly shows the structure of a membrane in cross-section.

FIG. 22 shows a model of a module provided with a membrane. Located at the arrow is the membrane.

We claim:

1. A module having included therein a membrane, which module consists essentially of a membrane housing, comprising a porous part and walls, and a membrane supported on said porous part, said module being obtainable by the application of a synthesis solution for a zeolite film to said porous part in the membrane housing, followed by crystallization of the zeolite layer resulting in a gastight zeolite layer, and by calcination of the said gastight zeolite layer, while passing over an oxygen-containing gas at a temperature of at least 350° C., whereby the continuous zeolite layer is formed in one step, and in which process through the formation of the zeolite layer any openings between the porous part and the walls of the module are closed.

2. Module according to claim 1, wherein the whole of membrane housing and supported membrane is composed of not more than two materials.

3. Module according to claim 2, wherein the said porous part is composed of at least two layers, the underlayer having pores of from 5 to 5000 µm, and the upper layer having pores of from 0.5 to 10 µm.

4. Module according to claim 1, wherein the said porous part is composed of at least two layers, the underlayer having pores of from 5 to 5000 µm, and the upper layer having pores of from 0.5 to 10 µm.

5. Module according to claim 1, wherein the said porous part consists of sintered metal.

6. Module according to claim 1, wherein the orientation of the crystals of the zeolite layer is substantially the same.

7. Module according to claim 1, wherein the thickness of the zeolite layer ranges from 100 nm to 200 μm.

8. Module according to claim 1, in which the whole of support and membrane is stable at temperature up to 600° C.

9. Module according to claim 1, in which the transport substantially takes place through said micropores.

10. Module according to claim 1, in which the zeolite used is ZSM-5.

11. The use of a module according to claim 1, for physical separation of gases and/or liquids.

12. The use of a module according to claim 1, as a catalytic reactor.

13. The use of a module according to claim 1, as a multifunctional membrane reactor for combined separation and catalytic reactions.

14. A method of separating gases and/or liquids using a module according to claim 1, which separation is based on the difference in adsorption and/or size and/or mobility of the gases to be separated.

15. A continuous gastight film of zeolites on a porous underlayer, suitable for use in the module according to claim 1.

16. A gastight film on a porous underlayer according to claim 15, having pores of from 5 to 5000 μm, provided with a top layer having pores of from 0.5 to 10 μm, which top layer is not thicker than 500 μm and preferably not thicker than 10 μm.

17. A gastight film according to claim 16, in which the orientation of the crystals of the zeolite layer is substantially the same.

18. A gastight film according to claim 17, in which the thickness of the zeolite layer ranges from 100 nm to 200 μm.

19. A gastight film according to claim 15, in which the orientation of the crystals of the zeolite layer is substantially the same.

20. A method of producing a membrane module having included therein a membrane, which module consists essentially of a membrane housing, comprising a porous part and walls, and a membrane supported on said porous part, said process comprises applying a synthesis solution for a zeolite film to said porous part in the membrane housing, followed by crystallization of the zeolite layer resulting in a gastight zeolite layer, and by calcination of the said gastight zeolite layer, while passing over an oxygen containing gas at a temperature of at least 350° C., whereby the continuous zeolite layer is formed in one step, and in which process through the formation of the zeolite layer any openings between the porous part and the walls of the module are closed.

21. A module produced using the method according to claim 20, for physical separation of gases and/or liquids.

22. A module produced using the method according to claim 20, for use as a catalytic reactor.

23. A module produced using the method according to claim 20, for use as a multifunctional membrane reactor for combined separation and catalytic reactions.

24. A method of separating gases and/or liquids using a module produced according to the method of claim 20, which separation is based on the difference in adsorption and/or size and/or mobility of the gases to be separated.

* * * * *